United States Patent [19]
Moore

[11] Patent Number: 5,683,182
[45] Date of Patent: Nov. 4, 1997

[54] HIGH PRESSURE BAG

[75] Inventor: Robin Ian Moore, Ballito, South Africa

[73] Assignees: Nampak Products Limited; H L & H Timber Products (Proprietary) Limited, Sandton, South Africa

[21] Appl. No.: 683,457

[22] Filed: Jul. 18, 1996

Related U.S. Application Data

[62] Division of Ser. No. 409,515, Mar. 16, 1995, Pat. No. 5,634,721.

[30] Foreign Application Priority Data

Mar. 17, 1994 [ZA] South Africa .................. 94/1895

[51] Int. Cl.⁶ .................................................. B65D 30/26
[52] U.S. Cl. ........................ 383/66; 383/3; 383/109; 206/522; 410/119
[58] Field of Search ...................... 383/3, 66, 88, 383/109; 206/522; 410/119

[56] References Cited

U.S. PATENT DOCUMENTS

| | | | |
|---|---|---|---|
| 3,199,689 | 8/1965 | Feldkamp | 206/522 X |
| 3,414,140 | 12/1968 | Feldkamp | 206/522 |
| 3,426,891 | 2/1969 | Marks | 410/119 |
| 3,556,318 | 1/1971 | Hollis | 383/3 X |
| 3,667,625 | 6/1972 | Lucas | 410/119 |
| 3,808,981 | 5/1974 | Shaw | 206/522 X |
| 3,868,026 | 2/1975 | Baxter | 206/522 X |
| 4,136,788 | 1/1979 | Robbins | 206/522 X |

FOREIGN PATENT DOCUMENTS

| | | | |
|---|---|---|---|
| 37347 | 2/1984 | Japan | 383/3 |

*Primary Examiner*—Jes F. Pascua
*Attorney, Agent, or Firm*—Ladas & Parry

[57] ABSTRACT

A high pressure bag for pre-stressing a support pack in an underground mine has a fluid impervious liner and three tubular envelopes. The liner is located in the first envelope with end portions of the first envelope and edge strips of the liner folded over underneath the first envelope. The first envelope with the liner therein are in the second envelope, with end portions of the second envelope folded over on top of the second envelope. The second envelope is located within the third envelope which has opposed edges stitched closed. The liner has a nozzle which extends through openings in the envelopes.

60 Claims, 4 Drawing Sheets

HIGH PRESSURE BAG

This is a divisional of application Ser. No. 08/405,515 filed on Mar. 6, 1995, now U.S. Pat. No. 5,634,721.

This invention relates to a high pressure bag. The bag may, in particular, be filled, in use, with grout and may be intended to be used as a pre-stressing bag for pre-stressing a support pack in an underground mine.

In accordance with the invention there is provided a high pressure bag which includes a fluid impervious rectangular liner having a first edge and an opposed second edge;

a filling nozzle fast with a wall of the liner close to the first edge thereof;

a first envelope which is of a flexible material;

a second envelope which is also of a flexible material;

with the liner being located within the first envelope which is within the second envelope, the first and second envelopes both having openings through which the nozzle extends;

with the first envelope having a flap folded over the first edge of the liner and a flap folded over the second edge of the liner; and with the second envelope also having a flap folded over the first edge and a flap folded over the second edge.

Each flap may comprise two layers of material and edge portions of the liner adjacent the first and second edges may also be folded over.

Further according to the invention there is provided a high pressure bag which includes a fluid impervious rectangular liner having a first edge and an opposed second edge;

a filling nozzle fast with a wall of the liner close to the first edge thereof; and a first envelope which is of a flexible material;

with the liner being located within the first envelope which has an opening through which the nozzle extends; and with edge portions of the liner adjacent the first and second edges folded over.

This bag may include a second envelope that is also of a flexible material, the first envelope being located within the second envelope, the second envelope also having an opening through which the nozzle extends, and the first envelope having a double layer flap folded over each of the folded over edge portions of the liner.

The edge portions of the liner are folded over together with the flaps of the first envelope such that the edge portions of the liner are sandwiched between edge portions of the first envelope forming the flaps.

It will be appreciated that the liner has a dimension extending from the first edge to the second edge and the first envelope has a corresponding dimension which is longer than that of the liner. Similarly, the second envelope also has a corresponding greater dimension.

The liner is preferably tubular with the first and second edges extending transversely to a tubular axis and being sealed closed.

The liner is also preferably substantially flat in its deflated condition and has a first side from which the nozzle extends and an opposed second side and the flaps of the first envelope both overlie the same side of the liner.

The flap of the first envelope at the first edge of the liner may overlie one side of the liner and the flap of the second envelope at the first edge may overlie the other side of the liner, with the flaps of the first and second envelopes at the second edge also overlying opposite sides of the liner.

The flap of the second envelope at the first edge of the liner may overlie that side of the liner from which the nozzle extends, the flap being sufficiently large to extend over the nozzle, both layers of material defining the flap having an opening through which the nozzle extends.

The bag may include a third envelope which also has an opening through which the nozzle extends.

The second envelope, with the liner and the first envelope therein, may be located within the third envelope, or the first envelope, with the liner therein, may be located within the third envelope, which is located within the second envelope.

The third envelope may have flaps which are folded over edges of the second envelope extending transversely to the first and second edges of the liner, or which are folded over edges of the first envelope extending transversely to the first and second edges of the liner, depending on whether the third envelope is outside or inside the second envelope.

Instead, the third envelope may have edges that extend transversely to the first and second edges of the liner, that are secured together, by stitching, glueing, or the like.

The envelopes may also be tubular, end portions thereof defining their flaps.

The flaps of the various envelopes may be held in their folded positions by glue or tape.

The bag may be substantially square. Thus, the liner may be longer in one direction (between the first and second edges) and shorter in the transverse direction so that when its edge portions are folded over it is substantially square. Similarly, the first and second envelopes will be longer in one direction than in the other. The third envelope, on the other hand, may be substantially square or elongate, depending on whether it has flaps or its edges are stiched closed.

The envelopes may be of a woven material with the strands thereof being of a synthetic plastics material. The weft threads of the weave may conveniently extend circumferentially with the warp threads extending longitudinally. The weft threads may conveniently have a higher tensile strength than the warp threads. The openings in the first, second and third envelopes may be defined between two weft threads of each envelope so that the integrity of the envelopes is maintained.

The nozzle may have a valve located therein. A washer may be arranged about the nozzle on an outer surface of the outermost envelope to retain the valve in position, in use.

Further according to the invention there is provided a method of manufacturing a high pressure bag, which includes providing a fluid impervious rectangular liner having a first edge and a second edge with a filling nozzle fast with a wall of the liner close to the first edge thereof;

providing a first envelope;

inserting the liner into the first envelope with the nozzle extending through an opening in a wall of the first envelope;

folding flap portions of the first envelope over the first and second edges of the liner;

providing a second envelope;

inserting the first envelope with the liner therein into the second envelope; and folding flap portions of the second envelope over the first and second edges of the liner.

As indicated above each flap portion may comprise two layers of material.

Edge portions of the liner adjacent the first and second edges may also be folded over. The edge portions of the liner may be folded over together with the flaps of the first envelope such that the edge portions of the liner are sandwiched between the flap portions of the first envelope.

The liner may be flat and have opposed sides and the flap portions of the first envelope may be folded over to overlie the same side of the liner. Further the flap portion of the first envelope at the first edge may be folded to overlie one side of the liner and the flap portion of the second envelope at the first edge may be folded to overlie the other side of the liner, and the flap portions of the first and second envelopes at the second edge are also folded over to overlie opposite sides of the liner.

The flap portion of the second envelope at the first edge may be folded over to overlie the nozzle, and may be sufficiently large to extend over the nozzle, both layers of material defining the flap portion having an opening through which the nozzle extends.

The second envelope, containing the first envelope and the liner, may be inserted into a third envelope, which also has an opening through which the nozzle extends, or the first envelope may be inserted into a third envelope which is then inserted into the second envelope.

Flap portions of the third envelope may be folded over or end portions of the third envelope extending transversely to the first and second edges may be secured together.

By means of the invention an extremely strong bag is provided which can be pumped to a pressure of 1 000 MPa.

The invention is now described, by way of examples, with reference to the accompanying drawings.

Figure 1:
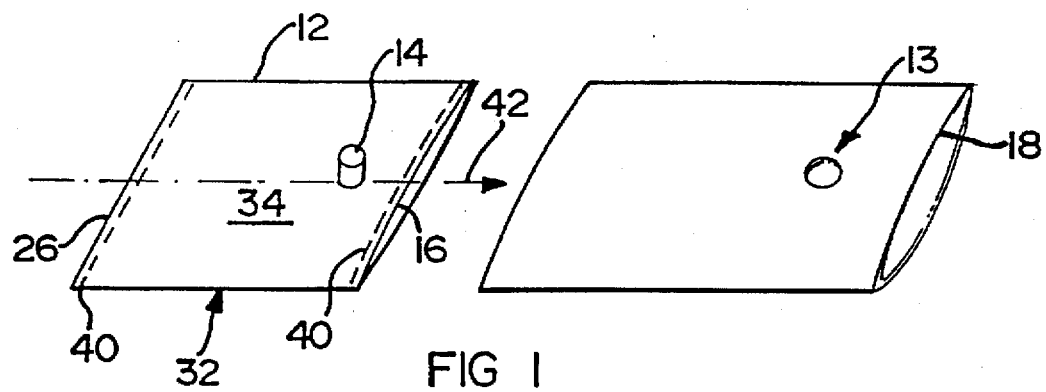
FIG. 1 shows a first step in the manufacture of a first embodiment of a high pressure bag in accordance with the invention.

In the drawings, reference numeral 10 generally indicates a first embodiment of a high pressure bag in accordance with the invention.

The bag 10 includes a fluid impervious rectangular liner 12 with a filling nozzle 14 fast with a wall of the liner 12 close to an edge 16 (the "nozzle edge") thereof.

The bag 10 further includes a first envelope 18, a second envelope 20 and a third envelope 22. The envelopes 18, 20 and 22 are of a reinforced flexible material.

The liner 12 is located within the first envelope 18. The first envelope 18 has a double layer flap 24.1 folded over the nozzle edge 16 and a double layer flap 24.2 folded over an opposed edge 26 of the liner 12. An opening 13 is defined in a wall of the envelope 18 to accommodate the nozzle 14.

As can be seen from the drawings, the liner 12 and the first envelope 18 are both located within the second envelope 20. An opening 21 is defined in a wall of the second envelope 20 to accommodate the nozzle 14. The second envelope 20 also has a double layer flap 28.1 folded over the nozzle edge 16 and a double layer flap 28.2 folded over the opposed edge 26.

The liner 12, the first envelope 18 and the second envelope 20 are all located within the third envelope 22 to form the bag 10.

It will be appreciated that the liner 12 has a dimension extending from the nozzle edge 16 to the opposed edge 26 and the first envelope 18 has a corresponding dimension which is longer than that of the liner 12. Similarly, the second envelope 20 has a corresponding dimension greater than that of the liner 12 and the third envelope 22 has a corresponding dimension slightly greater than that of the liner 12.

Figure 7:
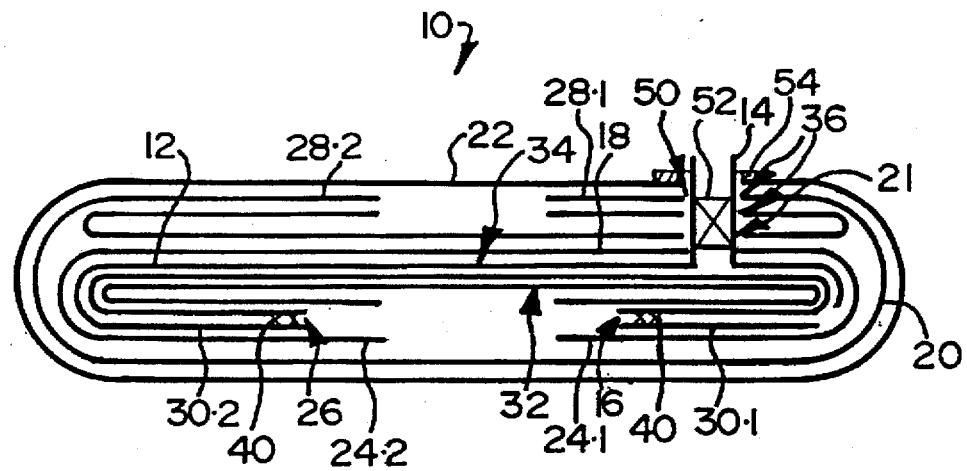
FIG. 7 shows a sectional side view of the first embodiment of the bag taken through A—A of FIG. 6.
Figure 8:
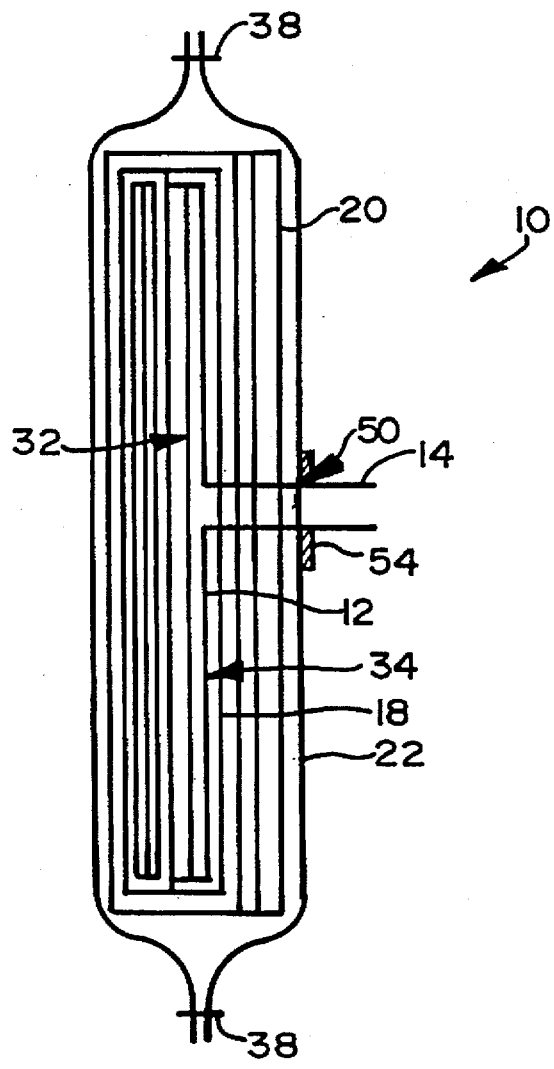
FIG. 8 shows a sectional front view of the first embodiment of the bag taken through B—B of FIG. 6.

The nozzle 14 is spaced a short distance away from its associated edge 16 As can best be seen in FIG. 7, a short portion 30.1 of the liner 12 along the nozzle edge 16 and a short portion 30.2 along the opposed edge 26 are folded over together with the flaps 24.1, 24.2, respectively, of the first envelope 18. The flaps 24.1, 24.2 together with the liner portions 30.1, 30.2 sandwiched therein are folded over to lie against an underneath side 32 of the first envelope 18 opposite the nozzle 14.

The flaps 28.1, 28.2 of the second envelope are folded over in the opposite direction to the first flaps 24.1 and 24.2. Thus, the flaps 28.1, 28.2 are folded over to be on top of an upper side 34 of the liner 12. The flaps 28.1, 28.2 of the second envelope 20 are sufficiently large so that, on the side 34, the flap 28.1 overlies the nozzle 14. Corresponding openings 36 are provided in both layers of the flap 28.1 to accommodate the nozzle 14.

The third envelope 22 has end edges which are stitched closed to form seams 38. The seams 38 extend perpendicularly to the nozzle edge 16. Further, the third envelope 22 has an opening 50 defined in a wall thereof to accommodate the nozzle 14.

The bag 10 is substantially square. Thus, the liner 12 is longer in one direction (between the nozzle edge 16 and the opposed edge 26) and shorter in the transverse direction to provide the portions 30.1 and 30.2 that are folded over. Similarly, the first and second envelopes 18, 20 are longer in one direction than in the other. The third envelope 22, on the other hand, is substantially square.

The liner 12 and the envelopes 18, 20, 22 are formed from tubular elements. The liner 12 then comprises a length of tube having a longitudinal axis 41 with the transverse open ends thereof sealed closed at 40 with one of these ends being at the nozzle edge 16 and the other end being at the opposed edge 26. Similarly, the first and second envelopes 18, 20 are lengths of tube with open end portions forming the flaps 24.1, 24.2, 28.1, 28.2. Further, the third envelope 22 also comprises a length of tube with the open ends thereof being stitched closed to form the seams 38.

The envelopes 18, 20, 22 are of a woven material with the strands thereof being of a synthetic plastics material. The weft threads of the weave extend circumferentially while the warp threads extend longitudinally. The weft threads have a higher tensile strength than the warp threads. The openings 13, 21, 36, 50 in the envelopes 18, 20, 22 are all defined between pairs of weft threads on each envelope 18,20,22. Hence, only warp threads are parted to define the openings 13, 21, 36, 50. This serves to maintain the integrity of the envelopes 18, 20, 22.

The nozzle 14 has a valve 52 arranged therein to facilitate filling and emptying of the liner. A washer 54 is arranged about the nozzle on an outer surface of the third envelope to retain the valve 52 in position.

FIGS. 1 to 6 show various stages in the construction of the bag 10.

In FIG. 1, the liner 12 is inserted in the direction of the arrow 42 into the first envelope 18 with the nozzle 14 extending through the opening 13.

Figure 2:
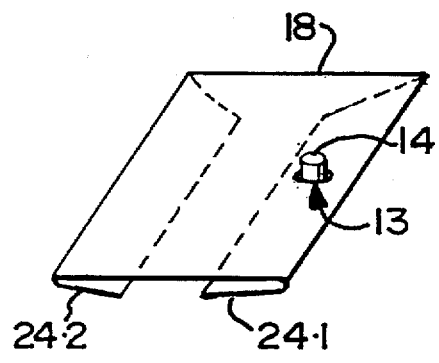
FIG. 2 shows a second step in the manufacture of the bag.

In FIG. 2, the double layer flaps 24.1, 24.2 are folded over together with the liner portions 30.1, 30.2, respectively, to be on the underneath side 32 of the liner 12.

Figure 3:
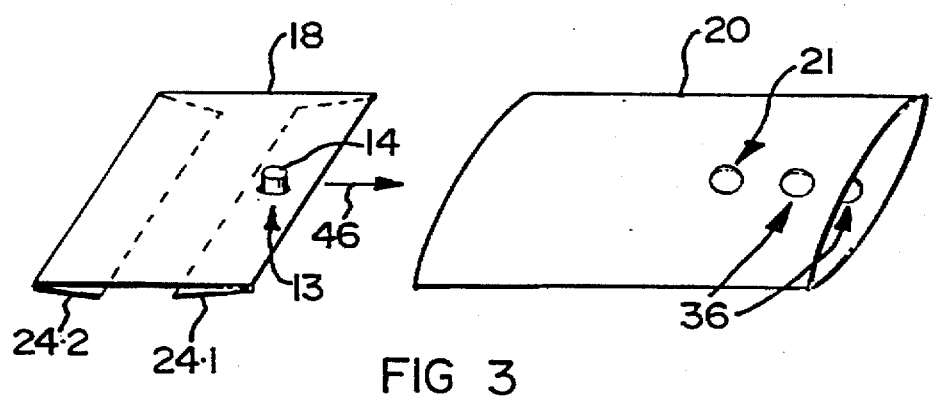
FIG. 3 shows a third step in the manufacture of the bag.

In FIG. 3, the liner 12 and the first envelope 18 are inserted in the direction of the arrow 46 into the second envelope 20 with the nozzle 14 extending through the opening 21. As seen in the drawing, the flaps 24.1 and 24.2 extend transversely to the longitudinal axis of the second envelope 20.

Figure 4:
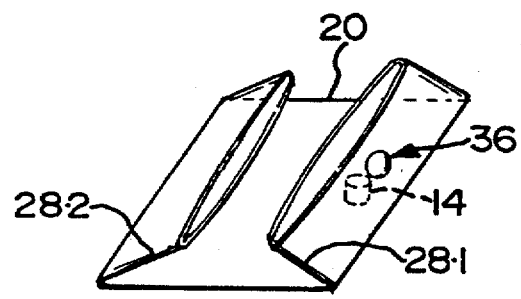
FIG. 4 shows a fourth step in the manufacture of the bag.

In FIG. 4, the flaps 28.1, 28.2 are folded over to be on top of the side 34 of the liner 12, with the nozzle 14 extending through the openings 36.

Figure 5:
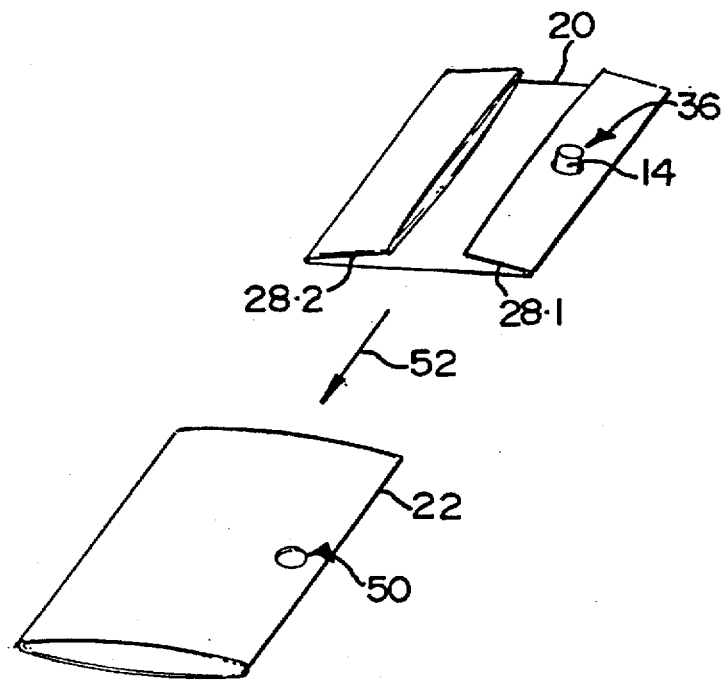
FIG. 5 shows a fifth step in the manufacture of the bag.
Figure 6:
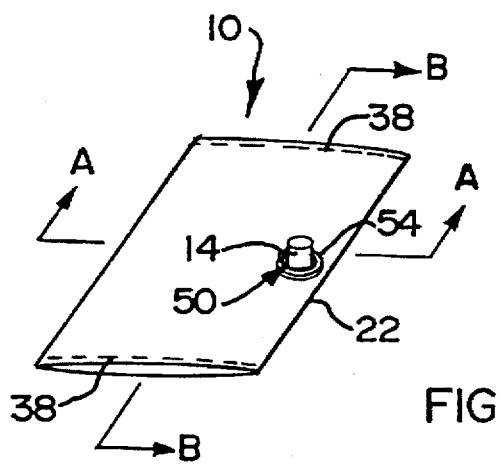
FIG. 6 shows the first embodiment of the bag.

In FIG. 5, the liner 12, the first envelope 18 and the second envelope 20 are inserted in the direction of the arrow 52, into the third envelope 22 with the nozzle 14 extending through the opening 50. The flaps 28.1 and 28.2 extend parallel to the longitudinal axis of the third envelope. The open ends of the third envelope 22 are then stitched closed to form the seams 38 as shown in FIG. 6. The washer 54 is then placed in position to retain the valve 52 within the nozzle 14.

The material utilised in the construction of the liner 12 and the envelopes 18, 20, 22 is such that the bag 10 is capable of being pumped to a pressure of 1 000 Ma.

Figure 9:
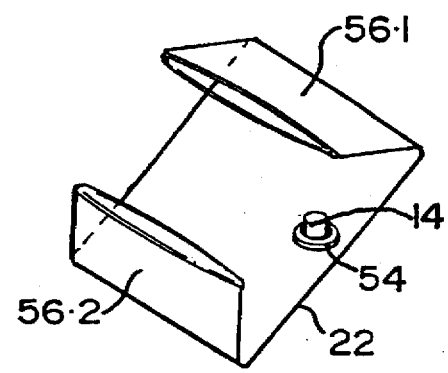
FIG. 9 shows a final step in the manufacture of a second embodiment of a bag in accordance with the invention.

Referring to FIG. 9, a final step in the manufacture of a second embodiment 64 of a high pressure bag in accordance with the invention is shown. With this embodiment, the third envelope 22 is longer than that shown in FIG. 5 to provide flaps 56.1 and 56.2 that are folded over and secured in place by means of adhesive tape (not shown).

Figure 10:
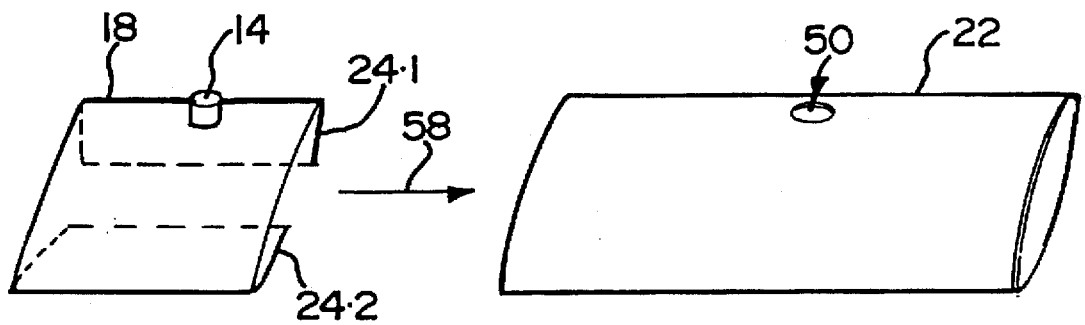
FIG. 10 shows a third step in the manufacture of a third embodiment of a bag in accordance with the invention.
Figure 11:
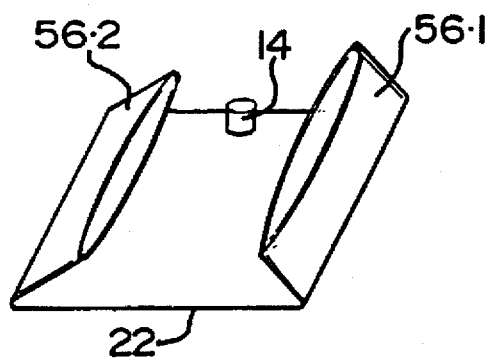
FIG. 11 shows a fourth step in the manufacture of the third bag.
Figure 12:
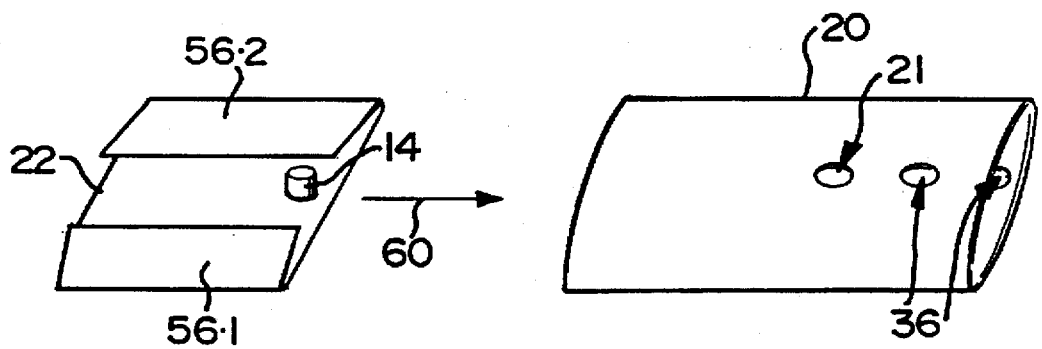
FIG. 12 shows a fifth step in the manufacture of the third bag.

The manufacture of a third embodiment of a high pressure bag in accordance with the invention is shown in FIGS. 10 to 12. With this embodiment, the first two steps are as shown in FIGS. 1 and 2. The first envelope 18, with the liner 12 therein and flaps 24.1 and 24.2 folded over, is then inserted into the third envelope 22, with the flaps 24.1 and 24.2 extending longitudinally with respect to the third envelope 22. The flaps 56.1 and 56.2 of the third envelope 22 are folded over and the third envelope is then inserted into the second envelope 20, with the flaps 56.1 and 56.2 extending longitudinally with respect to the second sleeve 20. The flaps 28.1 and 28.2 of the second envelope 20 are then folded over, as illustrated in FIG. 4, and taped down.

Instead of the third envelope 22 being as long as shown in FIG. 10, it may be shorter, as shown in FIG. 5. The edges are stitched down as illustrated in FIG. 6 and the third envelope 22, with the first envelope 18 and the liner 12 therein, is inserted into the second envelope 20 whose flaps 28.1 and 28.2 are then folded over.

I claim:

1. A high pressure bag which includes
   a fluid impervious rectangular liner having a first edge and an opposed second edge;
   a filling nozzle fast with a wall of the liner close to the first edge thereof;
   a first envelope which is of a flexible material and has an opening for the nozzle;
   with the liner being located within the first envelope with the nozzle extending through the opening;
   with edge portions of the liner adjacent the first and second edges folded over;
   a second envelope that is also of a flexible material, the first envelope with the liner therein being located within the second envelope, the second envelope also having an opening through which the nozzle extends; and
   a third envelope which is also of a flexible material and also has an opening through which the nozzle extends, the second envelope, with the liner and the first envelope therein, being located within the third envelope, the third envelope having flaps which are folded over edges of the second envelope extending transversely to the first and second edges of the liner.

2. The bag claimed in claim 1, in which the first envelope has a double layer flap folded over each of the folded over edge portions of the liner.

3. The bag claimed in claim 2, in which the edge portions of the liner are folded over together with the flaps of the first envelope such that the edge portions of the liner are sandwiched between edge portions of the first envelope forming the flaps.

4. The bag claimed in claim 1, in which the liner is tubular with the first and second edges extending transversely to a tubular axis and being sealed closed.

5. The bag claimed in claim 2, in which the liner is substantially flat and has a first side from which the nozzle extends and an opposed second side and the flaps of the first envelope both overlie the same side of the liner.

6. The bag claimed in claim 1, in which the first envelope is tubular, end portions thereof defining its flaps.

7. The bag claimed in claim 1, in which the second envelope is tubular, end portions thereof defining flaps that are folded over.

8. The bag claimed in claim 1, in which the first envelope is of a woven material, having warp and weft threads, with the weft threads extending parallel to the first edge of the liner.

9. The bag claimed in claim 2, in which the second envelope is of a woven material, having warp and weft threads, with the weft threads extending parallel to the first edge of the liner.

10. The bag claimed in claim 1, in which the third envelope is of a woven material, having warp and weft threads, with the weft threads extending transversely to the first edge of the liner.

11. A high pressure bag which includes
    a fluid impervious rectangular liner having a first edge and an opposed second edge;
    a filling nozzle fast with a wall of the liner close to the first edge thereof;
    a first envelope which is of a flexible material and has an opening for the nozzle;
    with the liner being located within the first envelope with the nozzle extending through the opening;
    with edge portions of the liner adjacent the first and second edges folded over;
    a second envelope that is also of a flexible material and which also has an opening through which the nozzle extends; and
    a third envelope which is also of a flexible material and also has an opening through which the nozzle extends, the first envelope, with the liner therein, being located within the third envelope, which is located within the second envelope, the third envelope having flaps which are folded over edges of the first envelope extending transversely to the first and second edges of the liner.

12. The bag claimed in claim 11, in which the first envelope has a double layer flap folded over each of the folded over edge portions of the liner.

13. The bag claimed in claim 12, in which the edge portions of the liner are folded over together with the flaps of the first envelope such that the edge portions of the liner are sandwiched between edge portions of the first envelope forming the flaps.

14. The bag claimed in claim 11, in which the liner is tubular with the first and second edges extending transversely to a tubular axis and being sealed closed.

15. The bag claimed in claim 12, in which the liner is substantially flat and has a first side from which the nozzle extends and an opposed second side and the flaps of the first envelope both overlie the same side of the liner.

16. The bag claimed in claim 11, in which the first envelope is tubular, end portions thereof defining its flaps.

17. The bag claimed in claim 11, in which the second envelope is tubular, end portions thereof defining flaps that are folded over.

18. The bag claimed in claim 11, in which the first envelope is of a woven material, having warp and weft threads, with the weft threads extending parallel to the first edge of the liner.

19. The bag claimed in claim 11, in which the second envelope is of a woven material, having warp and weft threads, with the weft threads extending parallel to the first edge of the liner.

20. The bag claimed in claim 11, in which the third envelope is of a woven material, having warp and weft threads, with the weft threads extending transversely to the first edge of the liner.

21. A high pressure bag which includes
a fluid impervious rectangular liner having a first edge and an opposed second edge;
a filling nozzle fast with a wall of the liner close to the first edge thereof; and
a first envelope which has an opening for the nozzle and which is of a flexible woven material, having warp and weft threads;
with the liner being located within the first envelope with the weft threads extending parallel to the first edge of the liner and with the nozzle extending through the opening; and
with edge portions of the liner adjacent the first and second edges folded over.

22. The bag claimed in claim 21, which includes a second envelope that is also of a flexible material, the first envelope being located within the second envelope, which also has an opening through which the nozzle extends, and the first envelope having a double layer flap folded over each of the folded over edge portions of the liner.

23. The bag claimed in claim 22, in which the edge portions of the liner are folded over together with the flaps of the first envelope such that the edge portions of the liner are sandwiched between edge portions of the first envelope forming the flaps.

24. The bag claimed in claim 21, in which the liner is tubular with the first and second edges extending transversely to a tubular axis and being sealed closed.

25. The bag claimed in claim 22, in which the liner is substantially flat and has a first side from which the nozzle extends and an opposed second side and the flaps of the first envelope both overlie the same side of the liner.

26. The bag claimed in claim 22, which includes a third envelope which also has an opening through which the nozzle extends.

27. The bag claimed in claim 26, in which the second envelope, with the liner and the first envelope therein, is located within the third envelope.

28. The bag claimed in claim 26, in which the first envelope, with the liner therein, is located within the third envelope, which is located within the second envelope.

29. The bag claimed in claim 27, in which the third envelope has flaps which are folded over edges of the second envelope extending transversely to the first and second edges of the liner.

30. The bag claimed in claim 27, in which the third envelope has edges that extend transversely to the first and second edges of the liner, that are secured together.

31. The bag claimed in claim 28, in which the third envelope has flaps which are folded over edges of the first envelope extending transversely to the first and second edges of the liner.

32. The bag claimed in claim 28, in which the third envelope has edges that extend transversely to the first and second edges of the liner, that are secured together.

33. The bag claimed in claim 21, in which the first envelope is tubular, end portions thereof defining its flaps.

34. The bag claimed in claim 22, in which the second envelope is tubular, end portions thereof defining its flaps.

35. The bag claimed in claim 22, in which the second envelope is of a woven material, having warp and weft threads, with the weft threads extending parallel to the first edge of the liner.

36. The bag claimed in claim 26, in which the third envelope is of a woven material, having warp and weft threads, with the weft threads extending transversely to the first edge of the liner.

37. A high pressure bag which includes
a fluid impervious rectangular liner having a first edge and an opposed second edge;
a filling nozzle fast with a wall of the liner close to the first edge thereof;
a first envelope which is of a flexible material and which has an opening for the nozzle;
with the liner being located within the first envelope with the nozzle extending through the opening in the first envelope;
with edge portions of the liner adjacent the first and second edges folded over and the first envelope having a double layer flap folded over each of the folded over edge portions of the liner;
a second envelope which also has an opening for the nozzle, the first envelope being located within the second envelope, the nozzle also extending through the opening in the second envelope, the second envelope being of a flexible woven material, having warp and weft threads, with the weft threads extending parallel to the first edge of the liner.

38. The bag claimed in claim 37, in which the edge portions of the liner are folded over together with the flaps of the first envelope such that the edge portions of the liner are sandwiched between edge portions of the first envelope forming the flaps.

39. The bag claimed in claim 37, in which the liner is tubular with the first and second edges extending transversely to a tubular axis and being sealed closed.

40. The bag claimed in claim 38, in which the liner is substantially flat and has a first side from which the nozzle extends and an opposed second side and the flaps of the first envelope both overlie the same side of the liner.

41. The bag claimed in claim 37, which includes a third envelope which also has an opening through which the nozzle extends.

42. The bag claimed in claim 41, in which the second envelope, with the liner and the first envelope therein, is located within the third envelope.

43. The bag claimed in claim 41, in which the first envelope, with the liner therein, is located within the third envelope, which is located within the second envelope.

44. The bag claimed in claim 42, in which the third envelope has edges that extend transversely to the first and second edges of the liner, that are secured together.

45. The bag claimed in claim 43, in which the third envelope has edges that extend transversely to the first and second edges of the liner, that are secured together.

46. The bag claimed in claim 37, in which the first envelope is tubular, end portions thereof defining its flaps.

47. The bag claimed in claim 37, in which the second envelope is tubular, end portions thereof defining its flaps.

48. The bag claimed in claim 41, in which the third envelope is of a woven material, having warp and weft threads, with the weft threads extending transversely to the first edge of the liner.

49. A high pressure bag which includes a fluid impervious rectangular liner having a first edge and an opposed second edge;

a filling nozzle fast with a wall of the liner close to the first edge thereof;

a first envelope which is of a flexible material and which has an opening for the nozzle;

with the liner being located within the first envelope with the nozzle extending through the opening in the first envelope; and with edge portions of the liner adjacent the first and second edges folded over and the first envelope having a double layer flap folded over each of the folded over edge portions of the liner;

a second envelope which is also of a flexible material and which also has an opening for the nozzle, the first envelope being located within the second envelope with the nozzle extending through the opening in the second envelope, and a third envelope which also has an opening through which the nozzle extends, the third envelope being of a flexible woven material, having warp and weft threads, with the weft threads extending transversely to the first edge of the liner.

50. The bag claimed in claim 49, in which the edge portions of the liner are folded over together with the flaps of the first envelope such that the edge portions of the liner are sandwiched between edge portions of the first envelope forming the flaps.

51. The bag claimed in claim 49, in which the liner is tubular with the first and second edges extending transversely to a tubular axis and being sealed closed.

52. The bag claimed in claim 49, in which the liner is substantially flat and has a first side from which the nozzle extends and an opposed second side and the flaps of the first envelope both overlie the same side of the liner.

53. The bag claimed in claim 49, in which the second envelope, with the liner and the first envelope therein, is located within the third envelope.

54. The bag claimed in claim 49, in which the first envelope, with the liner therein, is located within the third envelope, which is located within the second envelope.

55. The bag claimed in claim 54, in which the third envelope has flaps which are folded over edges of the second envelope extending transversely to the first and second edges of the liner.

56. The bag claimed in claim 53, in which the third envelope has edges that extend transversely to the first and second edges of the liner, that are secured together.

57. The bag claimed in claim 54, in which the third envelope has flaps which are folded over edges of the first envelope extending transversely to the first and second edges of the liner.

58. The bag claimed in claim 54, in which the third envelope has edges that extend transversely to the first and second edges of the liner, that are secured together.

59. The bag claimed in claim 49, in which the first envelope is tubular, end portions thereof defining its flaps.

60. The bag claimed in claim 49, in which the second envelope is tubular, end portions thereof defining its flaps.

* * * * *